Dec. 14, 1954   W. J. HINCKS   2,696,633
HIDE STRIPPING ASSEMBLY
Filed July 29, 1950   3 Sheets-Sheet 1
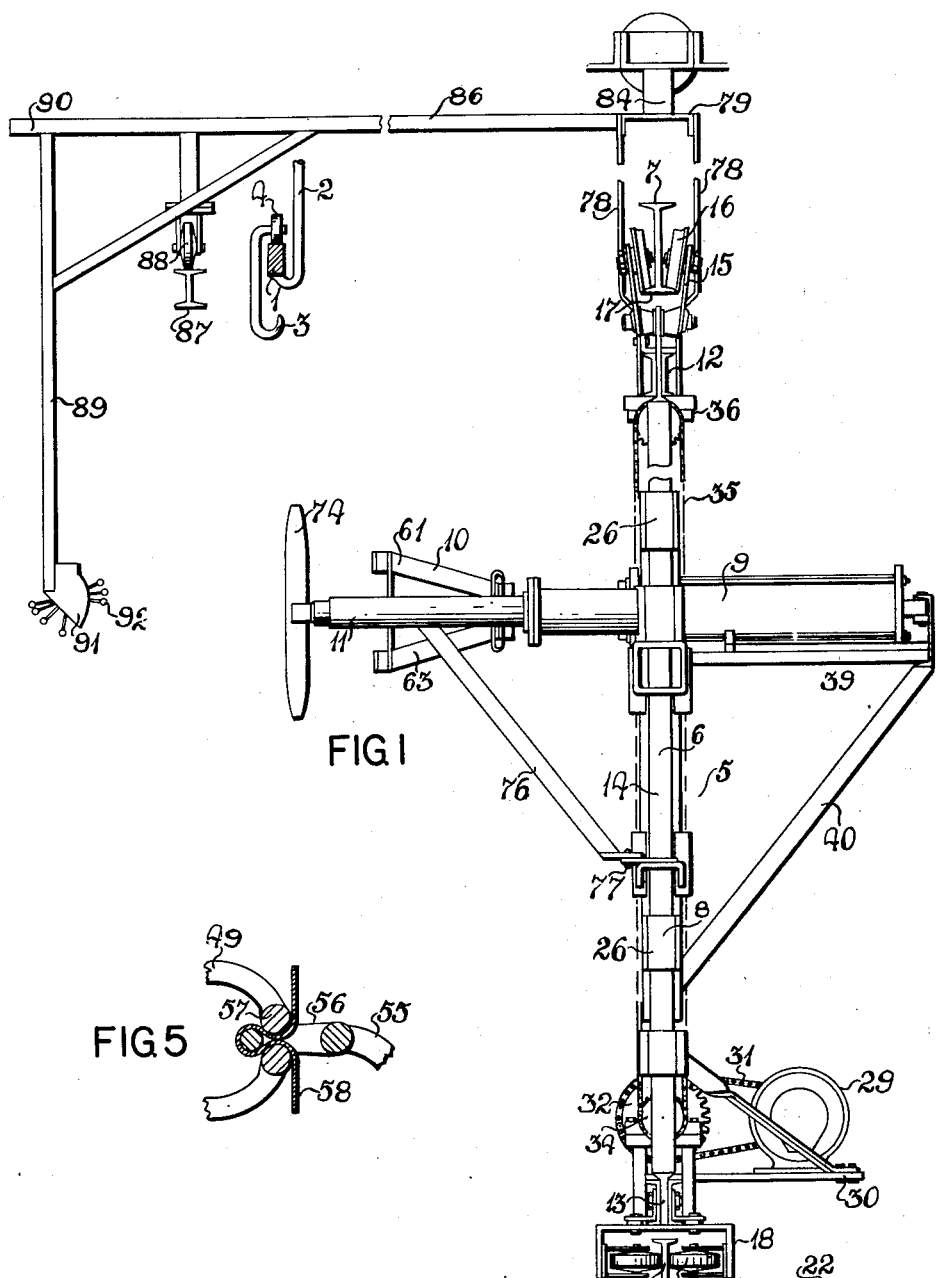

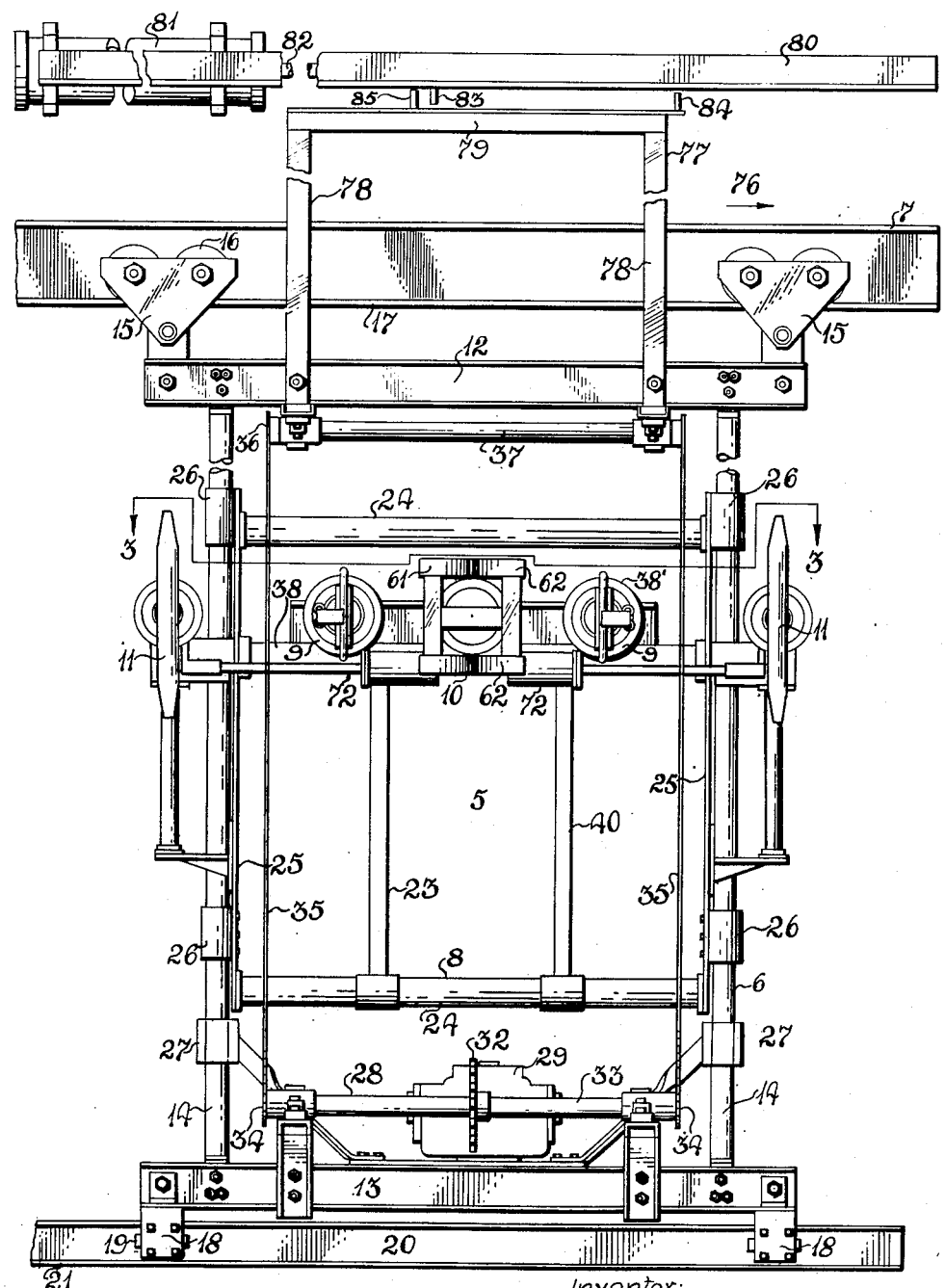

Dec. 14, 1954 W. J. HINCKS 2,696,633
HIDE STRIPPING ASSEMBLY
Filed July 29, 1950 3 Sheets-Sheet 3

Inventor:
William J. Hincks
By:
Featherstonhaugh & Kent.
Their Atty's

United States Patent Office

2,696,633
Patented Dec. 14, 1954

2,696,633

HIDE STRIPPING ASSEMBLY

William J. Hincks, Norwood, Manitoba, Canada, assignor to Canada Packers Limited, St. Boniface, Manitoba, Canada Application July 29, 1950, Serial No. 176,758

9 Claims. (Cl. 17—21)

My invention relates to new and useful improvements in assemblies for stripping the hide from cattle, an object of the invention being to provide a device of the character herewithin described whereby the hide can be stripped from the animal with the minimum amount of hand skinning.

A further object of my invention is to provide a device of the character herewithin described, the use of which permits the carcass of the animal to remain on a moving rail during the hide stripping process thereby eliminating the time consuming and laborious process commonly known as flooring.

Another object of my invention is to provide a device of the character herewithin described in which the hand skinning is reduced to a minimum, it being only necessary to slit initially the hide and remove same from the legs of the animal.

A yet further object of my invention is to provide a device of the character herewithin described which includes means for grasping the edges of the hide firmly and rapidly prior to stripping the hide from the carcass and which at the same time prevents damage or mutilation to the hide thereby preserving the quality thereof.

Another object of my invention is to provide a device of the character herewithin described which is adapted to travel parallel with the carcass from which the hide is being stripped thereby eliminating the necessity for stopping the moving carcass rail.

A yet further object of my invention is to provide a device of the character herewithin described in which all the relative movements are controlled from a central control box manipulated by a single operator.

A further object of my invention is to provide a device of the character herewithin described whereby the processing of cattle is speeded up considerably yet which at the same time permits the utilization of relatively unskilled labour instead of the highly paid skinning operators heretofore employed.

Another object of my invention is to provide a device of the character herewithin described which includes means whereby the assembly may be adjusted vertically between limits in order to position the hide-edge-gripping assemblies adjacent the most desirable area of the hide in order to give the maximum stripping effect.

Another object of my invention is to provide a device of the character herewithin described which includes a bracing member for restraining movement of the carcass towards the assembly thereby facilitating the action of the assembly and which furthermore, is capable of outward movement away from the assembly thus increasing the effective movement of the hide-edge-gripping assemblies.

A yet further object of my invention is to provide a device of the character herewithin described which includes radially moving members adapted to engage along the line of separation of the hide from the carcass thereby facilitating said separation by peeling back the hide from the carcass at the point of juncture.

A yet further object of my invention is to provide a device of the character herewithin described which is particularly suitable for use with compressed air or hydraulic fluid as a source of power.

Another object of my invention is to provide a device of the character herewithin described in which the separating members can be adjusted in order to vary their effective radius of action.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a side elevation of my device.

Figure 2 is a front elevation of my device with the control box removed for clarity.

Figure 5 shows a fragmentary view of one of my hide-edge-gripping assemblies in the closed or clamped position.

In the drawings like characters of reference indicate corresponding parts in the different figures.

Figure 4:
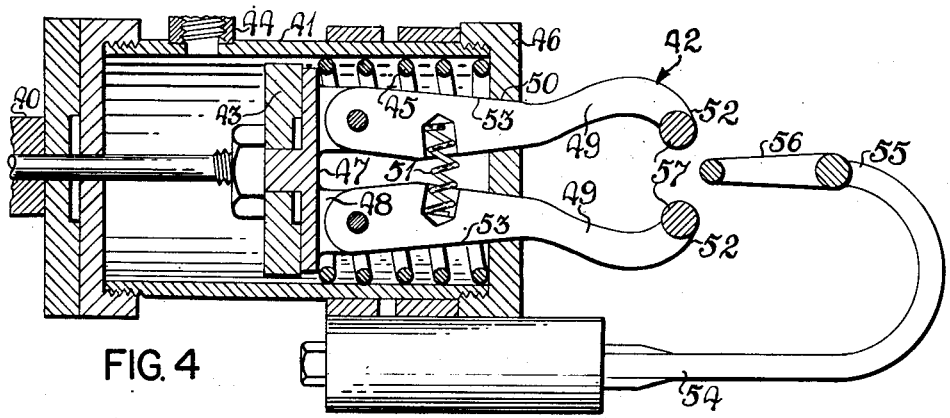
Figure 4 is an enlarged fragmentary side elevation of one of my hide-edge-gripping assemblies.

In the art of processing cattle in the present day packinghouse, it has become highly desirable to process the animal completely upon a moving rail.

However, due to the lack of an efficient skinning method, it has been common practice to remove the animal from the rail at a certain stage of processing whereupon skilled skinning operators remove the hide from the carcass while same is upon the floor by means of hand knives. This means that the operators are working continuously in a stooping position which causes a severe occupational hazard as well as being extremely fatiguing. After the hide has been removed in this fashion, the animal is then returned to the moving rail and processing is continued. It will be appreciated also that it is extremely difficult to maintain cleanliness of the floor thus engendering the risk of contamination of the carcass.

This process, which is commonly known as "flooring" apart from being extremely laborious and time consuming inasmuch as it interrupts the steady flow of cattle along the moving rail, requires the employment of highly skilled skinning operators in order to prevent damage to the hide and the flesh of the animal.

The assembly hereinafter to be described, accomplishes the skinning of the animal with the minimum amount of manual skinning and without removal of the carcass from the moving rail or interruption of the processing. The only manual skinning necessary is an initial slitting of the underside of the hide, known in the industry as "rimming," removal of the hide from the legs of the animal and peeling back sufficient of the hide in order to permit the engagement of the hide-edge-gripping assemblies incorporated therein.

Before proceeding with the detailed description of my device, a brief indication of its general function is hereby presented. The assembly is positioned adjacent to and parallel with the conventional moving carcass carrying rail and as the carcasses come within the range of the assembly, a pair of hide-edge-gripping assemblies extend past both sides of the carcass, the spinal area of which is towards the machine.

These gripping assemblies are secured to the slit edges of the hide whereupon they are moved rearwardly thus stripping the hide around the flanks and plate of the animal. At the same time, a thrust is placed against the spine of the carcass thus providing a reaction for the pull of the gripping assemblies.

When the hide has been stripped for a major part of the distance around the flanks and plate, a pair of separating components are adapted to engage along the line of separation of the hide from the carcass thus peeling the hide and assisting in the final stripping action.

During the stripping process, the carcass has moved along the rail carrying with it the assembly and at the completion of the stripping action, the assembly is adapted to be moved back to its original position ready for the next carcass.

Proceeding now to describe my invention in detail it will be seen from the accompanying drawings that Figure 1 shows a side elevation of my device situated adjacent to the carcass carrying rail 1 supported by members 2 and bearing hooks 3 upon which the carcass of the animal may be suspended, the hook 3 including a wheel 4 engaging with the outer surface of the rail 1.

The stripping assembly collectively designated 5 comprises a supporting framework generally indicated by the reference character 6 which is suspended from an overhead beam 7 of I-cross-sectional configuration as will hereinafter be described.

A sub-frame generally designated 8 is mounted upon the supporting structure 6 and is capable of limited vertical reciprocation thereupon. The subframe supports a pair of hide-edge-gripping assemblies collectively designated 9, a carcass bracing component collectively designated 10, and a pair of hide separating members collectively designated 11.

The aforementioned supporting framework 6 includes a head beam 12 and a foot beam 13 together with a pair of cylindrical guide members 14 extending therebetween thus forming a rectangular framework. Brackets 15 extend upwardly from each end of the head beam and carry double set of pulleys 16 which engage within the lower flange 17 of the aforementioned I beam 7 as clearly indicated in Figures 1 and 2.

By this means the entire assembly is suspended from the I-beam 7 and is capable of horizontal movement therealong as will hereinafter be described.

Brackets 18 extend downwardly from each end of the foot beam 13 and support sets of wheels 19 journalled for rotation in a horizontal plane, these wheels engaging each side of the vertical flange 20 of a further I-beam 21 situated adjacent the floor 22 and clearly shown in Figure 1 of the drawings.

The arrangement of the wheels 19 about the flange 20, while permitting the aforementioned horizontal movement of the assembly prevents same from swinging away from the vertical axis of the assembly when load is applied during the stripping action.

The aforementioned sub-frame 8 is mounted upon the supporting framework 6, and comprises a pair of transverse cylindrical members 24 and side members 25 situated inboard of the aforementioned cylindrical members 14. Cylindrical bearers 26 are secured adjacent the corners of the sub-frame and are journalled for reciprocation upon the aforementioned cylindrical members 14, the vertical travel of the sub-frame being limited by suitable stops 27.

Means for controlling the vertical movement of the sub-frame within the supporting framework is provided and takes the form of a sprocket and chain assembly collectively designated 28. A source of power for this vertical movement is provided in the form of an air motor 29 mounted upon a suitable platform 30 to the rear of the assembly, a chain 31 extending from said motor to a sprocket 32 keyed to a cross-shaft 33 supported in suitable bearings at the base of the supporting framework.

A pair of sprockets 34 are keyed to the extremities of the cross-shaft 33 and transmit power to a pair of vertically situated chains 35 which extend upwardly parallel with the aforementioned guide members 14 and pass over idling supporting sprockets 36 mounted upon an upper transverse shaft 37 secured to the aforementioned head beam 12.

The two ends of the chain 35 are secured to the rear of the sub-frame 8 being bolted to a further cross member 38 adjacent the location of the hide-edge-gripping assemblies 9. The details of this attachment are not shown in the accompanying drawings but it is believed that it will be apparent from the foregoing description that the sub-frame 8 is supported upon the guide members 14 by the chains 35 and the vertical movement thereof is controlled by the air motor 29 through the agency of the sprocket and chain assembly 28.

The hide-edge-gripping assemblies collectively designated 9 include a pair of telescopic air cylinders 38' mounted within a rectangular framework 39 secured to the aforementioned sub-frame 8 and extending rearwardly therefrom, diagonal braces 40 extending downwardly from the rear of the frame 39 to the lower member 24 of the sub-frame.

Cylinders 38' contain pistons and rods 39' which in turn contain further piston rods 40 thus giving a double extension for the minimum cylinder length. The extension and retraction of these pistons and cylinders together with the extension and retraction of the other moving components will hereinafter be described and in this connection it should be pointed out that the source of fluid power together with the conduits has been deleted from the drawings for clarity.

Situated upon the outboard ends of the piston rods 40 is a relatively short cylinder 41 and a set of hide-edge-gripping jaws collectively designated 42.

Cylinder 41 contains a piston 43 capable of reciprocation therein, forward movement of said piston being controlled by fluid pressure entering through an inlet 44, rearward movement of the piston being effected by the release of pressure from behind the piston and the extension of a coil spring 45 situated in front of the piston and reacting between same and the leading end caps 46 of the cylinder. In other words, movement of the piston 43 in a forward direction compresses spring 45, the extension of which returns the piston to its original position upon release of the fluid pressure through inlet 44.

Upon the forward surface 47 of the piston 43, I have provided a pair of lugs 48 to which are pivotally connected a pair of pivoting jaws specifically designated 49, said jaws extending through an aperture 50 formed centrally within the aforementioned leading edge cap 46 of the cylinder 41.

A further coil spring 51 reacts between the jaws or pivoting members 49 and maintains the engaging ends 52 thereof apart and the bearing surfaces 53 in engagement with the edges of the aperture to within the leading end cap 46. The aforementioned bearing surfaces 53 are inclined as clearly shown in Figure 4 of the accompanying drawings therefor causing a camming action when moved longitudinally through aperture 50, which camming action has the effect of closing the engaging end 52 of the jaws when the piston 43 moves forwardly within cylinder 41. Conversely, when spring 45 returns piston 43 to the rearward position, the aforementioned camming action enables spring 51 to separate or open the engaging end 52 during retraction.

The aforementioned set of jaws 42 includes as well as the pivoting members or jaws 49, a stationary jaw or member 54. This stationary member is secured to the forward end of the cylinder 41 and extends forwardly thereof, angulating through approximately 180° so that the outboard end 55 thereof is situated substantially within the area between the engaging ends 52 of the pivoting jaws.

The engaging end 56 of the stationary member 54 comprises in this embodiment, an oblongated loop formed of cylindrical stock within which vertically disposed friction rods 57 secured to the engaging end of the pivoting members 49, may engage.

Reference to Figure 4 will show the set of jaws in the open or retracted position under which circumstances the edge of the hide indicated fragmentarily at reference character 58 may be passed therebetween. Upon extension of piston 43 the pivoting jaws 49 move forwardly thus causing the aforementioned camming action to close the engaging ends thereof together within the oblongated loop 56 upon the stationary member thus securely locking the edge of the hide 50 in position as shown in the fragmentary drawing in Figure 5.

The aforementioned carcass bracing component 10 is also situated within the sub-frame 8 and includes a piston and cylinder assembly 59 supported by the aforementioned frame 39 and situated between the aforementioned piston and cylinder assemblies 38'. Extending forwardly from the piston rods of the assembly 59 are a pair of members 60 terminating in a semicircular shoe assembly 61. This assembly includes a pair of semi-circular strips 62 attached to the members 60 by means of braces 63. The shoe 61 is adapted to engage the spinal area of the carcass being stripped and serves two functions. First, it prevents the hide-edge-gripping assemblies from moving the carcass towards the assembly by bracing against the spine of the animal and secondly, the piston and cylinder assembly 59 associated with this bracing component is capable of exerting forward movement to the shoe 61 thereby facilitating the action of the hide-edge-gripping assemblies as will hereinafter be described.

Figure 3:
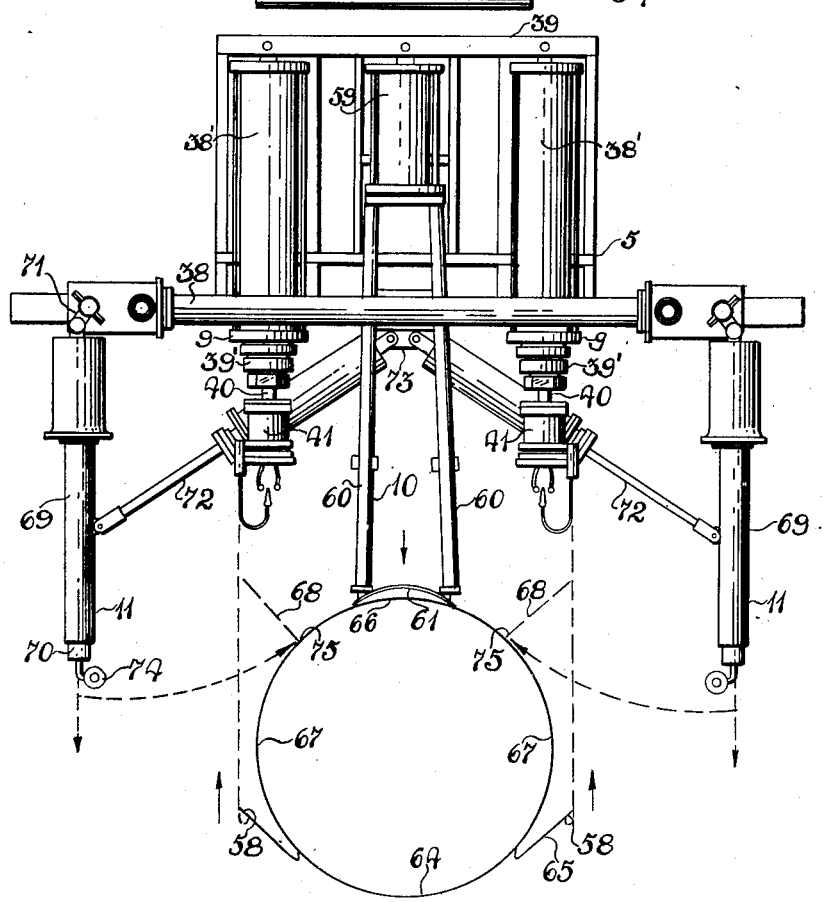
Figure 3 is a top plan view of my device taken along the lines 3—3 of Figure 2.

At this point, the operation of the portions of the stripping assembly that have been described, will be given and in this connection reference should be made to the schematic portion of Figure 3, of the accompanying drawings.

The carcass indicated schematically by reference character 64 is suspended by the hind legs from hooks 3 supported by the carcass rail 1.

The hide is slit manually or rimmed along the underside of the animal and skinned back to form the two flap portions 65 and freed from the legs of the animal.

The hide-edge-gripping assemblies 9 are extended forwardly one each side of the carcass 64 and the jaws 32 are engaged around the hide edges 58 as hereinbefore described. The carcass bracing component 10 is moved forwardly to engage the spinal area 66 of the carcass whereupon the hide-edge-gripping assemblies 9 are retracted thereby stripping the hide around the flanks and plate 67 of the carcass. During this retracting operation the shoe 61 is moved forwardly by means of piston and cylinder 59 thus assisting in the stripping action and at the completion of these movements the hide has been stripped back to a position substantially as shown in phantom by the reference character 68.

In order to assist in the separation of the hide from the carcass at this point, I have provided a pair of separating members collectively designated 11 which extend forwardly from the sub-frame 8 and outboard of the hide-edge-gripping assemblies 9.

These separating components include a cylinder 69 and a reciprocating piston rod 70 therein. Cylinder 69 is pivotally attached to a fulcrum bracket 71 which, in turn, is adjustably secured to extensions of the transverse member 38 of the sub-frame 8. Diagonally disposed piston and cylinder assemblies 72 extend between cylinders 69 and a bracket 73 centrally located upon the sub-frame 8 extension and retraction of these assemblies causing a radial movement of the separating components 11.

The aforementioned fulcrum bracket 71 being capable of limited rotation and setting will permit the radial sweep of the separating component to be varied to suit different conditions.

Vertical cylindrical rods 74 are secured at right angles to the ends of the piston rods 70 of the separating components 69 and movement of the diagonally situated piston and cylinder assemblies 72 will cause these rods 74 to engage along the line of separation 75 of the hide 68 from the carcass thus effecting a peeling effort which assists in the latter part of the stripping action thus permitting the hide to be stripped by the assembly almost to the backbone of the carcass.

Diagonal braces 76 support the outer ends of the separating components 69 and are pivotally secured to the sub-frame 8 as indicated by reference character 77, and in this connection it will be appreciated that this pivot point is substantially below the pivot point 71 of the component 69 thus preventing any undue strain in the radial sweep action thereof.

As hereinbefore described means have been provided for permitting movement of the stripping assemblies in a horizontal direction substantially parallel to the aforementioned carcass rail 1, and in the description of the supporting framework are mentioned the wheels or rollers 16 engaging the bottom flange 17 of the I-beam.

It will be appreciated that the carcass being stripped that is suspended from the hooks 3 is moving along rail 1 continuously and that the stripping of the hide is accomplished without stopping this movement. Consequently, the assembly will be pulled along beam 7 in the direction of movement of the carcass due to the attachment of the hide to the stripping assemblies. This movement is assisted by providing a slight incline to beam 7 which, in this embodiment, slopes downwardly in the direction of arrow 76, which also designates the direction of movement of the carcass upon the rail 1.

When the hide has been stripped from the particular carcass attached to the assembly, the assembly has to be moved in the opposite direction to arrow 76 thus positioning it ready to receive the next carcass.

In order to provide this return movement, I have included an upstanding bracket assembly collectively designated 77 which consists of four straps 78 extending upwardly from the head beam 12 of the supporting structure and passing each side of beam 7, the straps 78 being held in spaced relationship by means of a channel member 79 at the outer ends thereof. Situated above beam 7 is an angle iron framework 80 within which is mounted a cylinder 81 having a piston and rod 82 capable of reciprocation therein, rod 82 extending between the angle iron framework 80 and having a tongue 83 depending from the end thereof.

I have provided a pair of interceptor flanges 84 and 85 upstanding from the channel member 79 of the bracket assembly 77. From the foregoing it will be appreciated that the assembly can be moved in the direction of arrow 76 either by the movement of the carcass upon rail 1 or upon extension of piston rod 82 which causes the tongue 83 to engage with the interceptor flange 84.

Conversely, when it is desired to move the assembly in the opposite direction to arrow 76 then the piston rod 82 is retracted within cylinder 81 thus causing the tongue 83 to engage the interceptor flange 85 and draw the assembly in the desired direction.

Extending inwardly from the bracket assembly 77 is an over-spanning bracket 86 which passes clear over the carcass rail 1 and is supported cantileverwise upon a sub-rail 87 by means of a rail-engaging roller or wheel 88. A depending member 89 extends downwardly from the inner end 90 of the over-spanning bracket and supports a control box 91 in a convenient position for the operator of the device. This control box contains levers 92 which are connected through conventional valves and conduits to the various cylinder and piston assemblies of the device thus controlling the direction and flow of the source of fluid power as desired.

Having described my invention in detail, I will conclude with a brief summary of operations of the device.

The carcass 64 of the animal is suspended by the hind legs upon carcass rail 1 and is travelling continuously past the stripping assembly. The stripping assembly is positioned by means of cylinder 81 in order to engage the hide as soon as the carcass reaches the operating area of the assembly. The hide is rimmed along the underside of the carcass and peeled back to provide a flap 65 on each side and at the same time the hide is freed from the legs of the animal.

The hide-edge-gripping assemblies 9 are extended forwardly sufficient for the jaws 49 to engage around the edges 58 of the slit hide. The carcass bracing component 10 is extended so that the shoe 61 engages the spinal area 66 of the carcass whereupon the hide-edge-gripping assemblies 9 are retracted and at the same time the shoe 61 is extended thus stripping the hide around the flanks and plate 67 of the carcass.

When the hide has been substantially stripped from the carcass then the separating components 11, actuated by piston and cylinder assemblies 72, are caused to sweep radially towards the carcass engaging the hide at the line of separation indicated by reference character 75 thereby facilitating the final stripping of the hide from the carcass towards the spinal area 66.

During this time the assembly has travelled along rail 7 in line with the carcass and, when the jaws 49 are disengaged from the hide, the piston 82 is retracted within cylinder 81 thus returning the assembly along rail 7 to the starting position ready for the next carcass.

In conclusion, I wish to stress the action of the jaws 49 which, due to the friction rods 57 and the oblongated loop 56 securely clamps the edge of the hide without any possibility of slippage occurring and at the same time prevent any damage or mutilation occurring to the hide which may detract from the by-product values thereof.

Since many modifications can be made in the invention herein described and since the accompanying drawings have been prepared only to illustrate the relative arrangement and interaction of parts and not with regard to accuracy of dimensions for manufacturing purposes which in view of this disclosure I consider to entail merely mechanical skill together with the skill of the mechanical draftsman, and since many apparently widely different embodiments of this invention may be made within the spirit and scope of the accompanying claims without departing from such spirit and scope, it is intended that all matter contained in the accompanying specification shall be interpreted as illustrative only and not in a limiting sense and I desire only such limitations placed thereon as justice dictates.

What I claim as my invention is:

1. In the art of skinning cattle and in association with a source of power, an assembly for stripping the hide from the carcass while the animal is suspended by the legs from an overhead rail, the hide being manually slit along the underside thereof and partially skinned back; said assembly comprising in combination a supporting framework, a pair of hide-edge-gripping assemblies extending from said framework, a carcass bracing component also extending from said supporting framework between said pair of hide-edge-gripping assemblies and means on said supporting structure for effecting relative movement therebetween.

2. In the art of skinning cattle and in association with a source of power, an assembly for stripping the hide from the carcass while the animal is suspended by the legs from an overhead rail, the hide being manually slit along the underside thereof and partially skinned back; said assembly comprising in combination a supporting framework, a pair of hide-edge-gripping assemblies extending from said framework, means associated with said hide-edge-gripping assemblies for effecting movement of said hide-edge-gripping assemblies away from said carcass, and a pair of separating components secured by one end thereof to said supporting framework and extending therefrom, said separating components being situated outboard of each of said hide-edge-gripping assemblies, and means coacting between said supporting framework and said separating components adapted to engage the other ends of said separating components within the area of separation of said hide from said carcass, thereby facilitating said stripping.

3. The assembly according to claim 2 which includes means for extending and retracting said other ends of said separating components, said means including a piston rod and cylinder assembly for each of said separating components, said cylinders being pivotally connected to said supporting framework whereby said other ends of said separating components are adapted to move horizontally and through an arc, means adapted to move said other ends horizontally and through said arc, said means including a further piston and cylinder assembly for each of said separating components extending between a point along the length of each of said separating members, and a substantially central point on said supporting framework between said hide-edge-gripping assemblies, and a substantially vertically disposed rod on each of said first-mentioned piston rods.

4. The assembly according to claim 3 which includes means for adjusting within limits the radius of action of said other ends of said separating components, said means including a fulcrum bracket adjustably secured to said supporting framework, said first-mentioned cylinders being pivotally secured to said fulcrum brackets.

5. In the art of skinning cattle and in association with a source of power, an assembly for stripping the hide from the carcass while the animal is suspended by the legs from an overhead rail, the hide being manually slit along the underside thereof and partially skinned back, said assembly comprising in combination a supporting framework, a pair of hide-edge-gripping assemblies extending from said framework, a carcass bracing component also extending from said supporting framework between said pair of hide-edge-gripping assemblies, and means for effecting relative movement therebetween, and a pair of separating components secured by one end thereof to said supporting framework and extending therefrom, said separating components being situated outboard of each of said hide-edge-gripping assemblies, and means coacting between said supporting framework and said separating components adapted to engage the other ends of said separating components within the area of separation of said hide from said carcass, thereby facilitating said stripping.

6. The assembly according to claim 5 which includes means for extending and retracting said other ends of said separating components, said means including a piston rod and cylinder assembly for each of said separating components, said cylinders being pivotally connected to said supporting framework whereby said other ends of said separating components are adapted to move horizontally and through an arc, means adapted to move said other ends horizontally and through said arc, said means including a further piston and cylinder assembly for each of said separating components extending between a point along the length of each of said separating members, and a substantially central point on said supporting framework between said hide-edge-gripping assemblies, and a substantially vertically disposed rod on each of said first-mentioned piston rods.

7. The assembly according to claim 5 which includes means for adjusting within limits the radius of action of said other ends of said separating components, said means including a fulcrum bracket adjustably secured to said supporting framework, said first-mentioned cylinders being pivotally secured to said fulcrum brackets.

8. The assembly according to claim 5, which includes means whereby said assembly is capable of vertical movement between limits for positioning said hide-edge-gripping assemblies with relation to said carcass.

9. The assembly according to claim 8 in which said supporting structure includes a head beam and a foot beam, a pair of vertical guide members extending between said head and foot beams, a sub-frame capable of vertical reciprocation mounted upon said guide members, said hide-edge-gripping assemblies extending from said sub-frame, means for effecting vertical movement of said sub-frame upon said guide members between said head and foot beams, said means comprising a source of power and a chain and sprocket assembly connected to said source of power and said sub-frame.

References Cited in the file of this patent

UNITED STATES PATENTS

| Number | Name | Date |
| --- | --- | --- |
| 1,901,798 | Boomer | Mar. 14, 1933 |
| 2,300,312 | Polk, Sr. | Oct. 27, 1942 |
| 2,461,466 | Coad | Feb. 8, 1949 |
| 2,494,138 | DeMoss | Jan. 10, 1950 |
| 2,496,394 | Hincks | Feb. 7, 1950 |

FOREIGN PATENTS

| Number | Country | Date |
| --- | --- | --- |
| 667,670 | Germany | Dec. 6, 1938 |